United States Patent
Böcherer et al.

(10) Patent No.: US 10,826,619 B2
(45) Date of Patent: Nov. 3, 2020

(54) METHODS OF CONVERTING OR RECONVERTING A DATA SIGNAL AND METHOD AND SYSTEM FOR DATA TRANSMISSION AND/OR DATA RECEPTION

(71) Applicant: Technische Universität München, Munich (DE)

(72) Inventors: Georg Böcherer, Munich (DE); Patrick Schulte, Munich (DE); Fabian Steiner, Übersee (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 16/471,496

(22) PCT Filed: Dec. 11, 2017

(86) PCT No.: PCT/EP2017/082126
§ 371 (c)(1),
(2) Date: Jun. 19, 2019

(87) PCT Pub. No.: WO2018/114410
PCT Pub. Date: Jun. 28, 2018

(65) Prior Publication Data
US 2020/0092009 A1    Mar. 19, 2020

(30) Foreign Application Priority Data
Dec. 22, 2016   (EP) .................................... 16206103

(51) Int. Cl.
*H04B 10/61* (2013.01)
*H04B 10/50* (2013.01)
(Continued)

(52) U.S. Cl.
CPC ........... *H04B 10/612* (2013.01); *H04B 10/50* (2013.01); *H04L 1/0041* (2013.01); *H04L 1/0045* (2013.01); *H04L 27/3405* (2013.01)

(58) Field of Classification Search
CPC ...... H04B 10/50; H04B 10/612; H04B 10/25; H04B 10/516; H04L 1/0041;
(Continued)

(56) References Cited

U.S. PATENT DOCUMENTS 5,388,124 A * 2/1995 Laroia ............... H04L 25/03343
375/265
6,061,407 A * 5/2000 Cherubini ........... H04L 27/3411
375/262
(Continued)

FOREIGN PATENT DOCUMENTS

WO    WO 02/15443 A1    2/2002

OTHER PUBLICATIONS

Fred Buchali et al; Rate Adaptation and reach increase by probabilistically shaped 64 QAM: An Experimental demonstration; Journal of Light wave technology; Apr. 2016; pp. 1599-1609 (Year: 2016).*
(Continued)

*Primary Examiner* — Amritbir K Sandhu
(74) *Attorney, Agent, or Firm* — Dascenzo Gates Intellectual Property Law, P.C.

(57) ABSTRACT

A method (C) for converting a data signal (U). The method comprises processes of (i) providing an input bit stream (IB) of input bits (IBj), the input bit stream (IB) being representative for the underlying data signal (U) to be converted, and (ii) applying to consecutive disjunct partial input bit sequences ($IB^k$) of a number of k consecutive input bits (IBj) covering said input bit stream (IB) a distribution matching process (DM) to generate and output a final output bit stream (OB) or a preform thereof. The distribution matching pro-
(Continued)

cess (DM) is formed by a quadrant constellation shaping process (QS) and configured to map a respective partial input bit sequence ($IB^k$) to a constellation point of a four-dimensional $2^{4 \cdot m}$-QAM constellation—in particular conveying two distinct polarizations for each of an in-phase and a quadrature component—with l and m being fixed natural numbers and with k and m fulfilling the relation $4 \cdot m \geq k$.

20 Claims, 8 Drawing Sheets

(51) Int. Cl.
    *H04L 1/00*             (2006.01)
    *H04L 27/34*           (2006.01)

(58) Field of Classification Search
    CPC ... H04L 1/0045; H04L 27/34; H04L 27/3405; H04L 27/3416; H04L 27/3433
    USPC .................................................. 398/140–172
    See application file for complete search history.

(56) References Cited

U.S. PATENT DOCUMENTS

| | | | | |
|---|---|---|---|---|
| 8,625,688 | B2* | 1/2014 | Yeh | H04B 7/0632 375/260 |
| 9,077,508 | B2* | 7/2015 | Koike-Akino | H03M 13/6331 |
| 9,621,275 | B2* | 4/2017 | Kojima | H04B 10/508 |
| 2007/0283182 | A1* | 12/2007 | Defazio | G11C 7/222 713/500 |
| 2011/0267210 | A1* | 11/2011 | Risbo | H03M 7/3006 341/110 |
| 2013/0235744 | A1* | 9/2013 | Chen | H04L 47/82 370/252 |
| 2016/0309274 | A1* | 10/2016 | Ma | H03F 3/21 |
| 2019/0342138 | A1* | 11/2019 | Bocherer | H04L 27/3416 |
| 2020/0052713 | A1* | 2/2020 | Bocherer | H03M 7/4037 |

OTHER PUBLICATIONS

Georg Bocherer et al; Bandwidth efficient and rate matched low density parity check coded modulation; IEEE; Dec. 2015; pp. 4651-4665. (Year: 2015).*

Fred Buchali et al; Rate adaption and reach Increase by probabilistically shaped 64-QAM: An Experimental demonstration; Apr. 2016; Journal of lightwave technology, vol. 3, No. 7; pp. 1599-1609. (Year: 2016).*

Amjad, Rana Ali, "Algorithms for Simulation of Discrete, Memoryless Sources," a master's thesis presented to Technische Universität München Lehrstuhl für Nachrichtentechnik, Oct. 29, 2013, 75 pages.

Blahut, Richard E., "Computation of Channel Capacity and Rate-Distortion Functions," *IEEE Transactions on Information Theory* (Jul. 1972), vol. 18, No. 4, pp. 460-473.

Bocherer et al., "Bandwidth Efficient and Rate-Matched Low-Density Parity-Check Coded Modulation," *IEEE Transactions on Communications* (Dec. 2015), vol. 63, No. 12, pp. 4651-4665.

Böcherer et at., "Block-to-Block Distribution Matching," arXiv:1302.1020 (Feb. 5, 2013), 5 pages.

Böcherer, Georg, "Capacity-Achieving Probabilistic Shaping for Noisy and Noiseless Channels," a doctoral dissertation presented to Rheinisch-Westfälischen Technischen Hochschule Aachen, Feb. 13, 2012.

Buchali et al., "Rate Adaptation and Reach Increase by Probabilistically Shaped 64-QAM: An Experimental Demonstration," *Journal of Lightwave Technology* (Apr. 1, 2016), vol. 34, No. 7, pp. 1599-1609.

Eyuboglu, et al., "Advanced Modulation Techniques for V.Fast," *European Transactions on Telecommunications and Related Technologies* (1993), vol. 4, No. 3, pp. 243-256.

Kschischang, Frank R., "Optimal Nonuniform Signaling for Gaussian Channels," *IEEE Transactions on Information Theory* (May 1993), vol. 39, No. 3, pp. 913-929.

Schulte et al.,"Constant Composition Distribution Matching," *IEEE Transactions on Information Theory* (Jan. 2016), vol. 62, No. 1, pp. 430-434.

Sterian, et al., "Reducing the peak and average power for ODFM systems using QAM by constellation shaping" *European Transactions on Telecommunications* (Apr. 28, 2009), vol. 21, pp. 35-49.

* cited by examiner

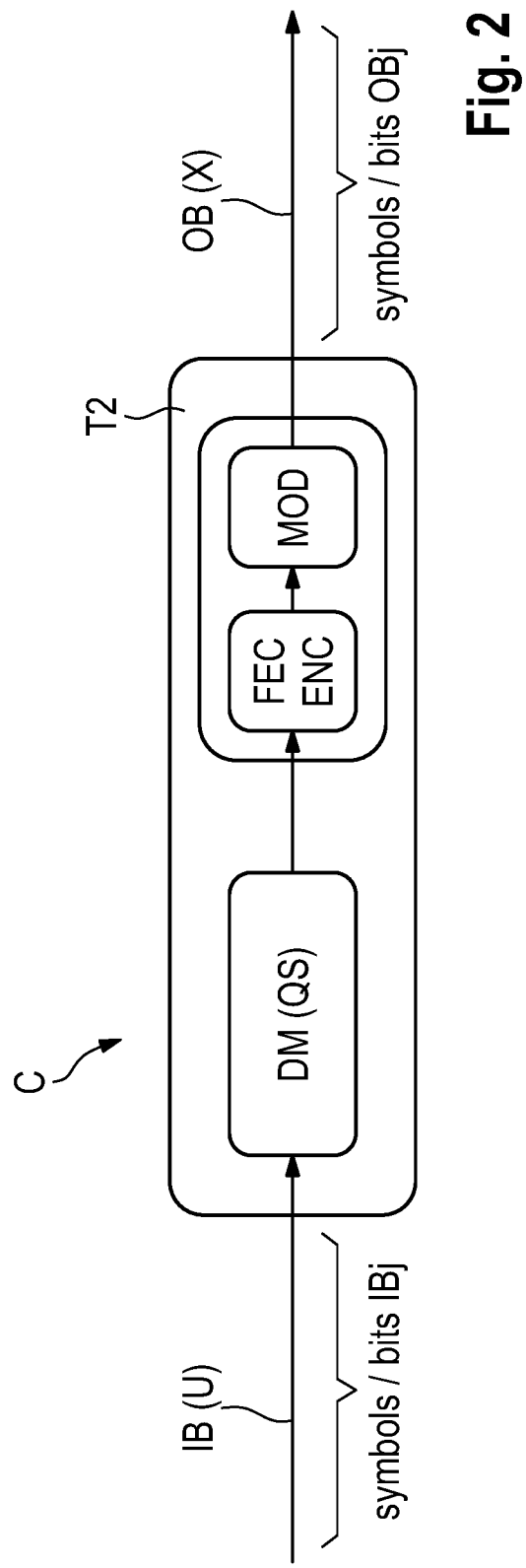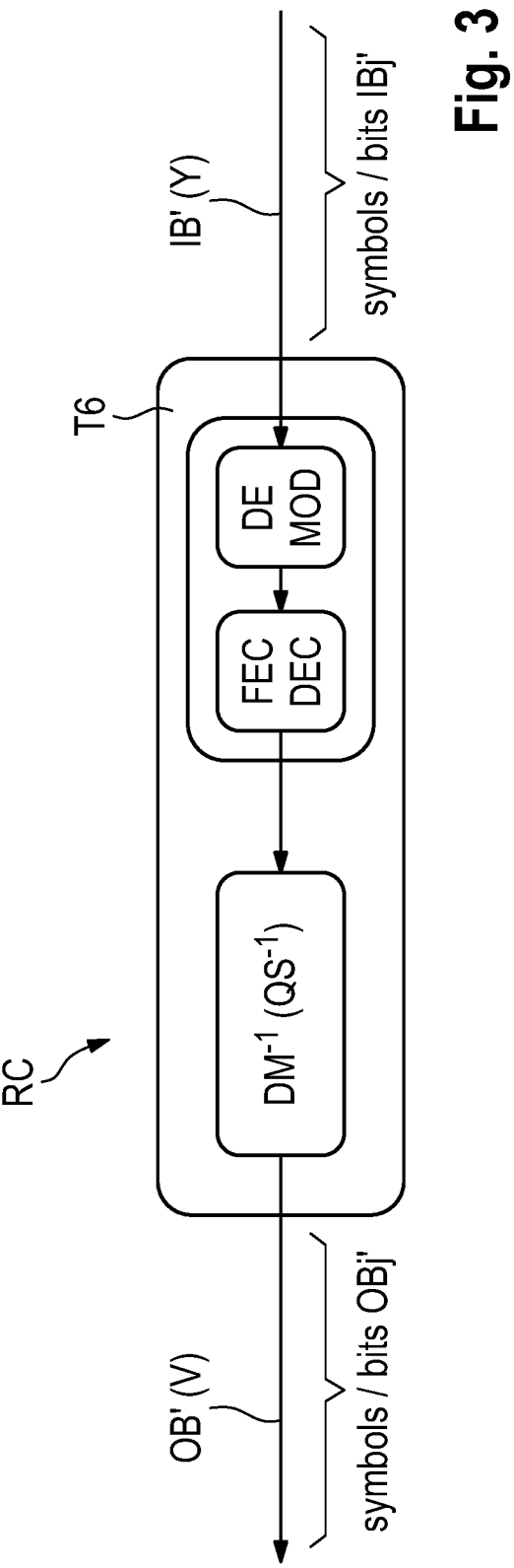

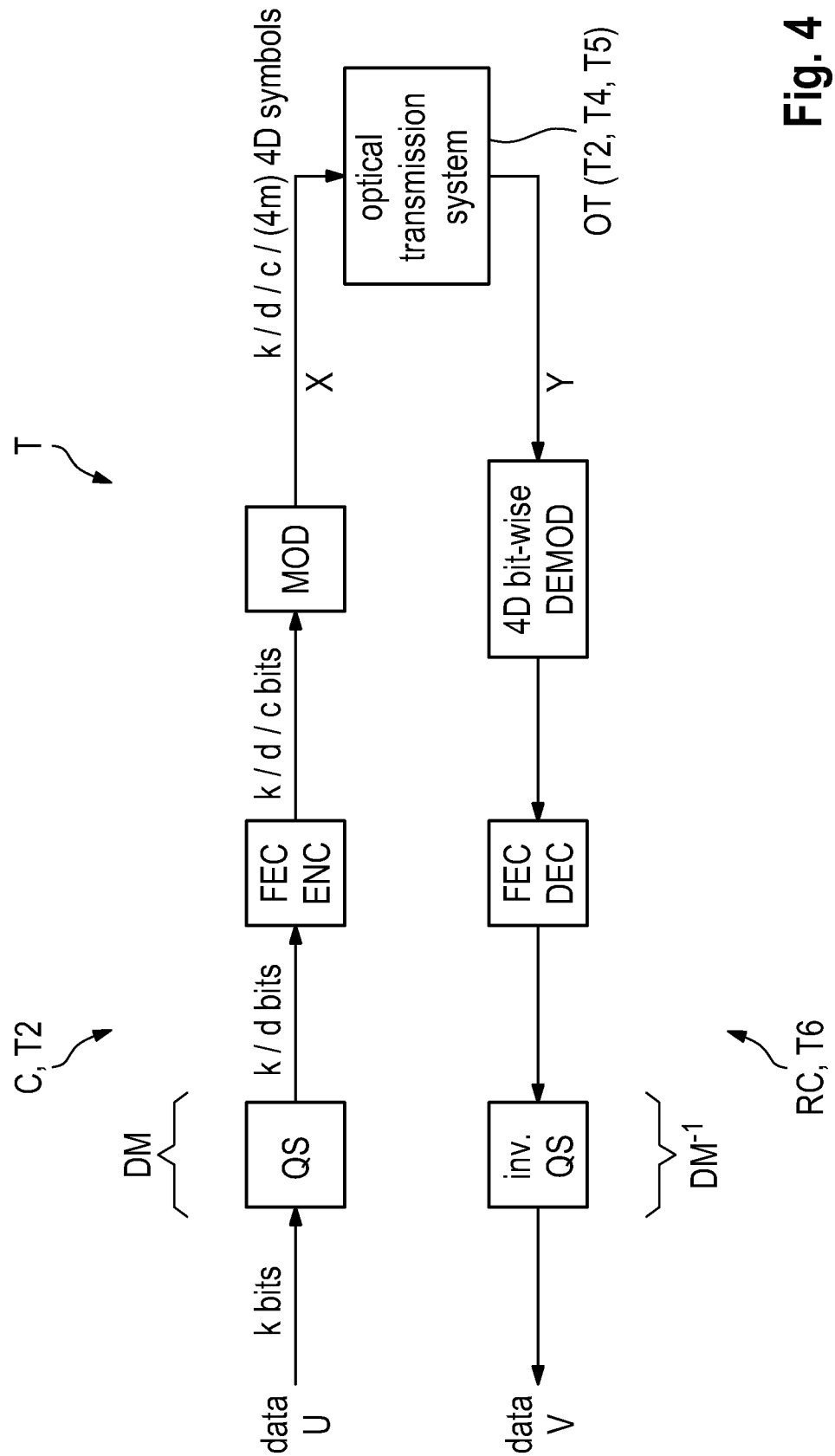

| data bits | quadrant bits $B_2B_3B_5B_6B_8B_9B_{11}B_{12}$ |
|---|---|
| 00000 | 01101010 |
| 00001 | 01101011 |
| 00010 | 01101110 |
| 00011 | 01111010 |
| 00100 | 10011010 |
| 00101 | 10011011 |
| 00110 | 10011110 |
| 00111 | 10100110 |
| 01000 | 10100111 |
| 01001 | 10101001 |
| 01010 | 10101010 |
| 01011 | 10101011 |
| 01100 | 10101101 |
| 01101 | 10101110 |
| 01110 | 10101111 |
| 01111 | 10110110 |
| 10000 | 10111001 |
| 10001 | 10111010 |
| 10010 | 10111011 |
| 10011 | 10111110 |
| 10100 | 10111111 |
| 10101 | 11011010 |
| 10110 | 11100110 |
| 10111 | 11101001 |
| 11000 | 11101010 |
| 11001 | 11101011 |
| 11010 | 11101110 |
| 11011 | 11101111 |
| 11100 | 11111010 |
| 11101 | 11111011 |
| 11110 | 11111110 |
| 11111 | 11111111 |

Table 2: QS by look-up table

Fig. 8

| state-of-the-art | SE | SNR@FER=$10^{-3}$ | PAPR | FEC Overhead |
|---|---|---|---|---|
| QAM | 6.6 bits / s / Hz | 11.2 dB | 3.68 dB | 82 % |
| 4D-QS | 6.6 bits / s / Hz | 10.95 dB | 1.25 dB | 25 % |

Table 1: Benefits of 4D-QS over state-of-the-art QAM.

| | $B_1$ | $B_2$ | $B_3$ | $B_4$ | $B_5$ | $B_6$ | $B_7$ | $B_8$ | $B_9$ | $B_{10}$ | $B_{11}$ | $B_{12}$ |
|---|---|---|---|---|---|---|---|---|---|---|---|---|
| $P_{B_i}(0)$ | 0.5000 | 0.1250 | 0.5312 | 0.5000 | 0.1250 | 0.5312 | 0.5000 | 0.1250 | 0.5312 | 0.5000 | 0.1250 | 0.5312 |

Table 3: Marginal distributions of the 12 bit levels of (12,9)-QS.

Fig. 9

METHODS OF CONVERTING OR RECONVERTING A DATA SIGNAL AND METHOD AND SYSTEM FOR DATA TRANSMISSION AND/OR DATA RECEPTION

The present invention refers to methods for converting or reconverting a data signal and to a method and a system for data transmission and/or data reception.

In the field of converting, transmitting and/or receiving data signals over certain kinds of channels in order to communicate symbol sequences a certain degree of power consumption is accompanied with the underlying processes.

The publication "rate adaptation and reach increase by a probabilistically shaped 64-QAM: An experimental demonstration" (Journal of lightwave technology, volume 34, number 7, pages 1599 to 1609) proposes a transmission system with adjustable data rate for single-carrier coherent optical transmission, which enables high-speed transmission close to the Shannon limit.

U.S. Pat. No. 5,388,124 A discloses a pre-coding scheme for transmitting data using optimally-shaped constellations over intersymbol-interference channels, wherein a pre-coding scheme for noisy whitening on ISI channels is presented, where the scheme permits any type of shaping and is comfortable with the Trellis coding.

It is an object underlying the present invention to present methods of converting or reconverting data signals and methods and systems for data transmission and/or data reception with an increased reliability of the underlying processes under reduced power consumption or at least improved power efficiency.

The object underlying the present invention is achieved by a method for converting a data signal according to independent claim 1 or alternatively by a method according to independent claim 7, by a method for data transmission and/or data reception according to independent claim 14 and by a data transmission and/or reception system according to independent claim 16. Preferred embodiments are defined in the respective dependent claims.

According to a first aspect of the present invention a method for converting a data signal is provided which comprises processes

- of providing an input bit stream of input bits, the input bit stream being representative for the underlying data signal to be converted, and
- of applying to consecutive disjunct partial input bit sequences of a number of k consecutive input bits covering said input bit stream, with k being a fixed—not necessarily—natural number, a distribution matching process in order to generate and output a final output bit stream or a preform thereof.

In practical implementations of the inventive method, the process of applying distribution matching to consecutive disjunct partial input bit sequences is not based on a single 4D symbol but on a plurality of 4D symbols. Under such circumstances said consecutive disjunct partial input bit sequences are formed of an average number of k consecutive input bits covering said input bit stream such that k is indeed a fixed and not necessarily natural number. This is further elucidated in connection with the sections below describing the quadrant shaping and the transmitter side and the receiver side thereof.

According to the present invention the distribution matching process is formed by a quadrant constellation shaping process and configured in order to map a respective partial input bit sequence to a constellation point of a four-dimensional $2^{4 \cdot m}$-QAM constellation—in particular conveying two distinct polarizations for each of an in-phase and a quadrature component—with m being a fixed natural number. Further according to the present invention k and m fulfill the relations $4 \cdot m \geq k$ and $k = J + I$ with I being a fixed natural number and with $J \leq 4$, thereby embedding each respective partial input bit sequence within the four-dimensional $2^{4 \cdot m}$-QAM constellation.

It is therefore a key aspect of the present invention to map tuples of input bits of length k as partial input bit sequences to constellation points of a $2^{4 \cdot m}$-QAM constellation fulfilling $4 \cdot m \geq$ and $k = J + I$ and thereby realizing and embedding inherently yielding a more power efficient signal shaping by enforcing a certain distribution.

According to a preferred embodiment of the method for converting a data signal according to the present invention said four-dimensional $2^{4 \cdot m}$-QAM constellation may be given as a or by a Gray code labeled four-dimensional QAM constellation and in particular based on a $2^m$-ASK constellation (ASK: amplitude shift keying).

Under such circumstances, each Gray code labeled constellation point of said four-dimensional $2^{4 \cdot m}$-QAM constellation may be defined or labeled by a 4·m-tuple $B_1 B_2 \ldots B_{4m}$ of bits, in particular with the components $B_1$, $B_{m+1}$, $B_{2m+1}$, $B_{3m+1}$ denoting or choosing—as sign bits—the constellation point's quadrant and further with the remaining components $B_2, \ldots B_m, B_{m+2}, \ldots, B_{2m}, B_{2m+2}, \ldots, B_{3m}, B_{3m+2}, \ldots B_{4m}$ denoting or choosing—as quadrant bits—the respective constellation point in a quadrant.

From the entire set of $2^{4 \cdot (m-1)}$ constellation points of a four-dimensional or 4D quadrant those $2^I$ constellation points may be chosen in each quadrant for said mapping on of said input bit stream which have the smallest power, in particular in order to thereby achieve a Gaussian like distribution of the constellation points mapped in each dimension or quadrant.

The distribution matching process may preferably be followed (i) firstly by a forward error correction encoding process and (ii) secondly by a QAM modulation process, in particular in this order.

From said k consecutive input bits IBj a number of I input bits IBj with $I \leq k$ may be used in order to select points in a quadrant and the remaining J input bits of said k input bits are used for specifying at least partly said sign bits such that $k = I + J$ is fulfilled in this case.

The mentioned sign bits used to form said components $B_1$, $B_{m+1}$, $B_{2m+1}$, $B_{3m+1}$ for the constellation points may originate from at least one of (a) a source of the input bit stream, (b) from parity bits after said forward error correction encoding process or (c) from both the input bit stream and the panty bits after said forward error correction encoding process.

In case of scheme (a) the sign bits stemmed completely from further data bits or input bits Bj, thus the system is operated in an uncoded manner having a code rate c fulfilling $c = 1$. In case of scheme (b) the code rate c fulfills the relation $c = (m-1)/m$ and in case of scheme (c) the code rate c fulfills the relation $c = (m-1+J/4)/m$ if a number of J input bits of the conveyed k input bits are used for specifying sign bits.

In particular, the following scheme may be adopted:

$c = 1 \Rightarrow J = 4$, $c = (m-1)/m \Rightarrow J = 0$, and $1 > c > (m-1)/m \Rightarrow 0 < J < 4$.

According to an additional or alternative aspect of the present invention a method for reconverting an—in particular already converted—data signal is presented. The reconverting method comprises processes of providing an input bit stream of input bits, the input bit stream—directly or indirectly—being representative for an underlying—in particular converted—data signal to be reconverted or a derivative thereof, and of applying to said input bit stream or to a derivative thereof an inverse distribution matching process in order to generate and output a final output bit stream.

According to this additional or alternative view of the present invention, the inverse distribution matching process may be formed by an inverse quadrant shaping process, in particular based on an underlying quadrant shaping process of a distribution matcher, and configured in order to remap a respective constellation point of a four-dimensional $2^{4 \cdot m}$-QAM constellation—in particular conveying two distinct polarizations for each of an in-phase and a quadrature component—to a partial output bit sequence of length k, with k=J+I and I and m being fixed natural numbers and fulfilling the relations $4 \cdot m \geq k$, k=J+I, and J≤4.

According to the present invention the consecutive partial output bit sequences are disjunct and thereby form and output the (re)converted signal.

The four-dimensional $2^{4 \cdot m}$-QAM constellation may preferably be given as a or by a Gray code labeled four-dimensional QAM constellation and in particular based on a $2^m$-ASK constellation.

Each Gray code labeled constellation point of said four-dimensional $2^{4 \cdot m}$-QAM constellation may be defined or labeled by a 4·m-tuple $B_1 B_2 \ldots B_{4m}$ of bits and in particular (i') with the components $B_1, B_{m+1}, B_{2m+1}, B_{3m+1}$ denoting or choosing—as sign bits—the constellation point's quadrant and further (ii') with the remaining components $B_2, \ldots, B_m$, $B_{m+2}, \ldots, B_{2m}, B_{2m+2}, \ldots, B_{3m}, B_{3m+2}, \ldots, B_{4m}$ denoting or choosing—as quadrant bits—the respective constellation point in a quadrant.

In order to achieve a better power efficiency, from the entire set of $2^{4 \cdot (m-1)}$ constellation points of a four-dimensional quadrant those $2^J$ constellation points may be chosen in each quadrant for said mapping of said input bit stream which have the smallest power, in particular in order to thereby achieve a Gaussian like distribution of the constellation points mapped in each quadrant.

The inverse distribution matching process may follow (a') a QAM demodulation process and (b') a forward error correction decoding process, in particular in this order.

In the following, further aspects of the present invention are discussed referring to both the method for converting as well as to the method for reconverting a data signal.

The distribution matching processes and said inverse distribution matching processes, said quadrant shaping process and said inverse quadrant shaping process, said QAM modulation and demodulation processes, and said forward error correction encoding and decoding processes may preferably be configured to be invertible or inverse, respectively, with respect to each other.

The process of providing the input symbol stream may comprise at least one of recalling the input symbol stream from a storage medium or from a symbol generation process, receiving, demodulating and/or decoding a signal being representative for or conveying the input symbol stream.

Said distribution matching processes, said inverse distribution matching processes, said quadrant shaping process, said inverse quadrant shaping process, said QAM modulation process, and/or said QAM demodulation processes may be at least one of based on and chosen according to a predefined distribution to be achieved for an output and in particular based on a Gaussian distribution, and in order to achieve an approach of the empirical distribution of the final output bit stream to the respective underlying distribution by accordingly indexing the respective output sequences out of a respective entire set of candidates.

The present invention may also be applied in connection with more general symbols other than bits forming the respective signals to be converted or reconverted. Also any intermediate signal may be represented by general symbols, according to a preferred embodiment of the methods for converting or reconverting a data signal following the concept of the present invention. In this sense, more general input and output symbol streams may be the underlying entities conveying the signals to be converted or reconverted.

However, in some practical applications—for instance in the context of fiber-optic communication systems—the inventive method may still focus on symbols in the form of binary digits, i.e. bits.

Thus and according to the present invention and in certain embodiments thereof the terms input symbol stream, partial input symbol sequence, symbol mapping process, symbol distribution matching process, final output symbol stream and the like may be focused on, thereby replacing bits by more general symbols and thus also replacing the specialized technical terms of input bit stream, partial input bit sequence, bit distribution matching process, final output bit stream and the like, respectively.

Each stage and even intermediate stages of the process according to the present invention may refer to more general symbols instead of bits and bit combinations as symbols.

According to another aspect of the present invention a method for data transmission and/or data reception is provided.

The inventive method comprises at least one of a data transmission section and a data reception section. The data transmission section and/or the data reception section may involve at least one of the inventive methods for converting data signal or for reconverting a data signal as described above.

In a preferred embodiment of the inventive method for data transmission and/or data reception, involved distribution matching process and the inverse distribution matching processes may be invertible or inverse with respect to each other.

A data transmission and/or data reception system is suggested by the present invention, too. The inventive system comprises a processing unit configured to perform any of the methods according to the present invention and comprises respective means for carrying out such methods.

In case of a combination of a transmission process/unit and a reception process/unit, these processes or units may be configured to exchange and/or negotiate data in order to define and fix the concrete form of the quadrant shaping, FEC and MOD properties.

Furtheron, the inventive methods as described above may be realized by a code acceptable and executable by a computer or a digital signal processing means.

Also within the scope of the present invention, a computer program product is provided, comprising a computer code adapted to let a computer and/or a digital signal processing means execute any of the methods according to the present invention when the code is run on the computer and/or the digital signal processing means, respectively.

These and further aspects, details, advantages and features of the present invention will be described based on embodiments of the invention and by taking reference to the accompanying figures.

FIGS. 2 and 3 are block diagrams elucidating in more detail general aspects of the methods for converting and reconverting a data signal according to the present invention.

FIG. 4 is a block diagram for elucidating a preferred embodiment of a data transmission and/or data reception system according to the present invention and the embedding of the methods for converting/reconverting a data signal embedded therein.

FIGS. 5 to 10 exemplify aspects of concrete embodiments of the method for converting a data signal according to the present invention.

In the following embodiments and the technical background of the present invention are presented in detail by taking reference to accompanying FIGS. 1 to 10. Identical or equivalent elements and elements which act identically or equivalently are denoted with the same reference signs. Not in each case of their occurrence a detailed description of the elements and components is repeated.

The depicted and described features and further properties of the invention's embodiments can arbitrarily be isolated and recombined without leaving the gist of the present invention.

Figure 1:
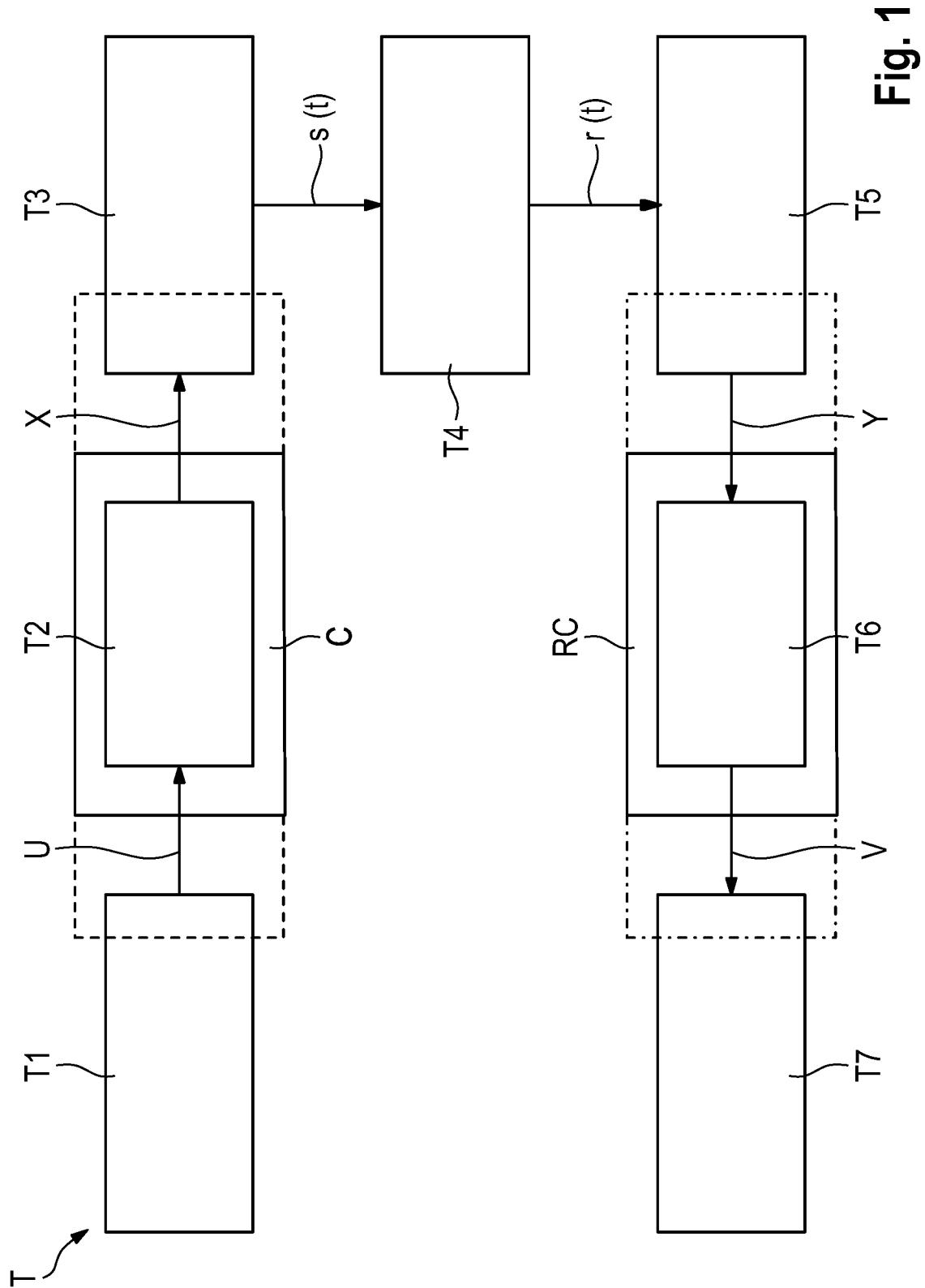
FIG. 1 is a block diagram for elucidating an embodiment of a data transmission and/or data reception system according to the present invention and the embedding of the methods for converting/reconverting a data signal embedded therein.

Before going into detail with respect to aspects of the methods for converting/reconverting a data signal and the methods for data transmission/reception reference is taken to FIG. 1 and its general view on systems and methods for data conversion/reconversion and/or data transmission/reception.

Therefore, FIG. 1 is a block diagram for elucidating embodiments of a data transmission and/or data reception system according to the present invention and the embedding of the methods for converting/reconverting a data signal embedded therein.

The scheme according to FIG. 1 generally follows the concept of coding and modulation in digital communication proposed in 1974 by Massey.

The scheme of FIG. 1 discloses a system T—being it a hardware structure, a configuration of a method or of processing units or a combination thereof—comprising (i) an information source unit T1 configured to provide a signal U to be converted and transmitted, an (ii) encoding unit T2 configured to receive and encode the signal U and to output an encoded signal X, (iii) a modulator unit T3 configured to receive and modulate the encoded signal X and to output a modulated signal s(t) for transmission over (iv) a transmission/reception waveform channel unit T4, (v) a demodulator unit T5 configured to receive the modulated signal s(t) in a form r(t) possibly distorted by the transmission channel unit T4 and to demodulate said signal in order to output a demodulated signal Y, (vi) a decoder unit T6 configured to receive and decode the demodulated signal Y and to output the decoded signal V, and (vii) an information sink unit T7 configured to receive the decoded signal V.

According to the present invention, the information source T1 and the information sink T17 may be any kind of information or signal sink or source, respectively. Any kind of storage medium may be used. Alternatively, any arbitrary other transmitting/receiving channel may be involved.

As already mentioned above, according to the present invention a method C for converting a data signal U and alternatively or additionally a method RC for reconverting a data signal Y are provided. These methods C and RC according to the present invention may embrace or be a part of the information encoding unit T2 and decoding unit T6, respectively. Additionally or alternatively, parts of the information source unit T1 and/or of the modulator unit T3 on the one hand and of the demodulator unit T5 and/or of the information sink unit T7 on the other hand may be realized, too.

FIGS. 2 and 3 elucidate by means of block diagrams in more detail general aspects of the method C for converting a data signal U and of a method RC for reconverting a data signal Y according to the present invention.

The data signal U obtained from an information source unit T1 in the case shown in FIGS. 1 to 4 is represented by or identical to an input symbol stream IB which is not necessarily but may be a stream of binary input digits or input bits IBj. The input symbol stream IB may have a finite length or may be represented as a continuous flow of symbols.

Overall, FIGS. 1 to 3 describe the entire transmission/reception system T.

FIG. 2 further elucidates by means of a schematic block diagram a preferred embodiment of an encoding process or unit T2 realizing an aspect of the present invention and thereby the signal conversion C of the transmission or transmitter side.

An input symbol or bit stream IB being representative for a signal or data signal U to be converted and comprising a stream of input symbols or input bits IBj is provided to the encoding process or unit T2. The encoding process or unit T2 is configured to process the input symbols or bits IBj in order to generate and output an output symbol stream OB which is representative to the converted signal X of FIGS. 1 and 2 and which comprises a stream of output symbols or output bits OBj.

In the embodiment shown in FIG. 2 the encoding process or unit T2 is formed by a first or preceding distribution matching process or unit DM defined by an quadrant constellation shaping process QS configured to generate from said input symbols or bits IBj a sequence of bits or symbols supplied to a forward error correction process or unit FEC followed by a QAM modulation process or unit MOD.

The QAM modulation process or unit MOD gives four dimensional symbols or bit sequences in time discrete form which are supplied to and transmitted by e.g. an optical transmission system OT which may be formed according to FIG. 1 by a modulator unit T3, a transmission/reception channel unit T4, and a demodulator unit T5, wherein the modulator unit T3 and the demodulator unit T5 are capable of digital/analog and analog/digital conversion/modulation, respectively.

FIG. 3 further elucidates by means of a schematic block diagram a preferred embodiment of a decoding process or unit T6 realizing an aspect of the present invention and thereby the signal (re)conversion RC of the reception or receiver side.

As indicated already above the signal Y to be converted and formed by input symbols or bits IBj' is fed into a demodulator DEMOD which operates four dimensionally followed by a forward error correction decoder FEC DEC. The resulting symbol or bit sequence is then fed to an inverse distribution matcher $DM^{-1}$ formed by an inverse quadrant shaping process or unit $QS^{-1}$.

By the concatenation of the processes DEMOD, FEC DEC and $DM^{-1}$ or $QS^{-1}$ the input signal Y to be (re) converted and given by input symbols/bits IBj' of the input symbol/bit stream IB' is transformed into a reconverted output signal V given by output symbols/bits OBj' of the output symbol/bit stream OB'.

FIGS. 4 to 10 described further details of embodiments of the present invention.

In particular, FIG. 4 elucidates by means of a schematic block diagram aspects of the encoding unit T2 already introduced in FIG. 1.

The encoding unit T2 forms a major part of the signal conversion section, process or unit C.

From the signal or data source T1 shown in FIG. 1 input symbols or bits IBj of the input symbol or bit stream IB representative for the signal U to be converted are fed to a distribution matching process DM formed by a quadrant shaping process or unit QS, wherein partial input bit sequences $IB^k$ of length k are selectively mapped onto a subset of four-dimensional $2^{4m}$-QAM constellation points of one quadrant taking into account an energy or power relationship.

The resulting constellation points of said QAM constellation are fed into a bit mapper BM formed by a forward error correction process FEC and a modulator MOD.

The resulting four dimensional symbols or bit sequences are fed to an optical transmission system OT which may be formed by the modulator unit T3, the transmission/reception channel unit T4 and the demodulator unit T5 as shown in FIG. 1.

At the receiver side the reception signal Y conveying input symbols/bits IBj' is fed to four-dimensional bit-wise demodulator DEMOD and a consecutive forward error correction decoder FEC DEC.

The resulting symbol or bit sequences output by the forward error correction decoder FEC DEC affect to an inverse distribution matching process or unit $DM^{-1}$ formed by an inverse quadrant shaping process or unit $QS^{-1}$ and configured to generate and output the reconverted signal V as a stream of output symbols or bits OBj'.

By the concatenation of the processes DM or $QS^{-1}$, FEC ENC and MOD the input signal U to be converted and given by input symbols/bits IBj of the input symbol/bit stream IB is transformed into a converted output signal X given by output symbols/bits OBj of the output symbol/bit stream OB.

In the following, these and additional aspects, features and/or properties of the present invention will be further elucidated:

The presented invention relates generally to communication systems, and more particularly to spectrally efficient transmission. The presented invention in particular relates to communication methods and systems and to techniques for generating sequences of symbols—e.g. from which constituting signals are to be transmitted—with desired distributions. With the measures suggested, it is possible to realize data transmission and reception with an increased degree of efficiency at reduced power requirements.

In order to achieve a power efficient communication—for instance over noisy channels—symbols to be transmitted within a signal are designed to follow a certain distribution. In order to achieve this, data bits or more general data symbols need to be mapped to a symbol sequence with a desired distribution. The mapping should be invertible, so that the original data symbols or bits can be recovered from the symbol sequence, for instance after the transmission and reception at a reception side.

Devices configured to realize such a mapping of original symbols or bits to a desired distribution of symbols or bits are called distribution matchers.

In order to achieve spectrally efficient communication over noisy channels, constellation shaping techniques impose a certain distribution on the transmitted symbols. Constellation shaping has recently received much interest from industry, especially for fiber-optic communications.

The present invention provides a new constellation shaping technique, which is highly parallelizable and therefore suitable for very high throughput implementation on chips.

Suggested coherent fiber optic communication systems are configured in order to modulate in-phase and quadrature components of two polarizations, thus corresponding to a four dimensional signal space, also referred to as 4D signal space. Each signal point has four real-valued components, i.e. its in-phase and its quadrature components, both in two polarizations.

In principle, four-dimensional or 4D constellation shaping—also referred to as 4D-CS—can achieve a higher spectral efficiency—also referred to as SE—than conventional quadrature amplitude modulation or QAM.

Furthermore, non-linear interference noise or NLIN of wavelength division multiplexed or WDM communications systems can depend on the modulation format, which makes 4D-CS a promising technique to mitigate the NLIN.

In a practical transceiving process or unit T, also referred to as a transceiver, 4D-CS is preferably combined with forward error correction, also referred to as FEC. At the receiver side, bit-metric decoding—also referred to as BMD—i.e., a combination of a bit-wise demapper with a binary decoder is desirable for complexity reasons.

It has been argued that 4D-CS requires more complex multistage decoding and it has been concluded that conventional QAM is superior to 4D-CS when bit-wise demapping is used.

According to the present invention a new modulation scheme as a distribution matcher is proposed which is called four-dimensional quadrant shaping and also referred to as 4D-QS. This modulation scheme improves conventional QAM schemes in several aspects:

(i) 4D-QS has a higher spectral efficiency and equivalently it is more power efficient.

(ii) 4D-QS has a lower peak-to-average-power ratio, also referred to as PAPR.

(iii) 4D-QS may have a lower forward error correction FEC overhead.

In Table 1 of FIG. 9, the improvements are shown for a system with spectral efficiency (SE) 6.6 bits/s/Hz. In this example, 4D-QS is 0.25 dB more power efficient, lowers the PAPR from 3.68 dB to 1.25 dB and reduces the FEC overhead from 82% to 25%.

The 4D-QS as a distribution matcher according to the present invention achieves these improvements in particular by modifying a conventional QAM scheme as follows:

(1) At the transmitter or transmission side, quadrant shaping or QS is performed prior to FEC encoding. The QS process or device can be implemented by using a small lookup table as described below.

(2) At the receiver or reception side, four-dimensional bit-wise demapping is performed prior to FEC decoding. The demapping is of low complexity and highly parallelizable as explained below.

Quadrant Shaping

One key aspects underlying the present invention is the formation of a distribution matcher as a quadrant shaping mechanism QS, and embodiment thereof being explained in the following:

Consider a Gray labeled four dimensional or 4D QAM constellation with $2^{4 \cdot m}$ signal points in total. It can be constructed by taking the Cartesian product of four Gray labeled amplitude-shift keying or ASK constellations.

Figure 5:
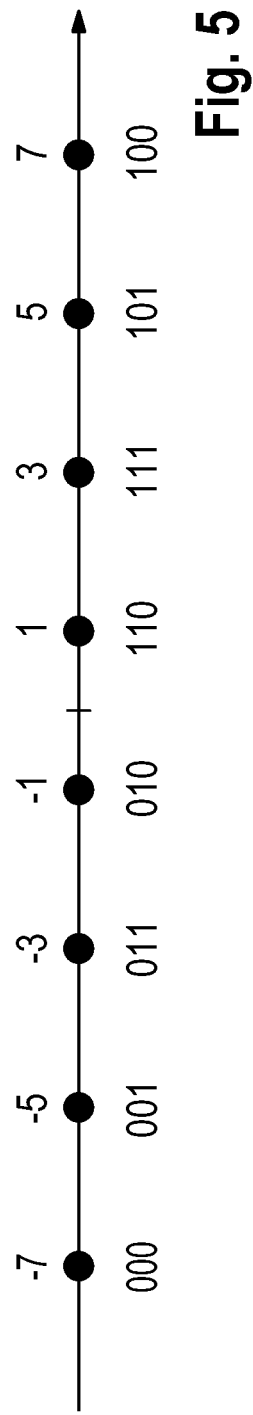

A Gray labeled 8-ASK constellation—i.e. with m=3 and thus $2^3$=8—is displayed in FIG. 5.

By the Gray labelling, each signal point is labeled by 4m bit-levels $$B=B_1 B_2 \ldots B_{4m} \in \{0,1\}^{4m}. \tag{0}$$

The bit-levels $$B_1, B_{m+1}, B_{2m+1}, B_{3m+1} \tag{1}$$

are defined in order to choose or select the quadrant of a respective signal point and are called sign bits.

In each quadrant, a number of $2^{4m-4}=2^{4(m-1)}$ different signal points can be defined and placed, which are chosen by the so called quadrant bits $$B_2 \ldots B_m B_{m+2} \ldots B_{2m} B_{2m+2} \ldots B_{3m} B_{3m+2} \ldots B_{4m}, \tag{2}$$

which are the remaining bits of the bit-levels shown in (0).

From the $2^{4(m-1)}$ possible signal points in a quadrant, according to the present invention the $2^I$ signal points of smallest power are selected for representing an input bit stream B being representative for the signal U to be converted. E.g., the power can be represented by a Euclidean metric or distance from the origin in the four dimensional signal space or constellation space.

The resulting modulation format is denoted by (4m; I+4)-QS.

According to the present invention, the 4D-QS scheme now maps I data bits of the input bit stream B representing the signal U to be converted to 4m-4 quadrant bits according to (2).

This mapping is exemplified in table 2 shown in FIG. 8, i.e. for a case with m=3 and I=5 and thus a (12, 9)-QS scheme.

Figure 6:
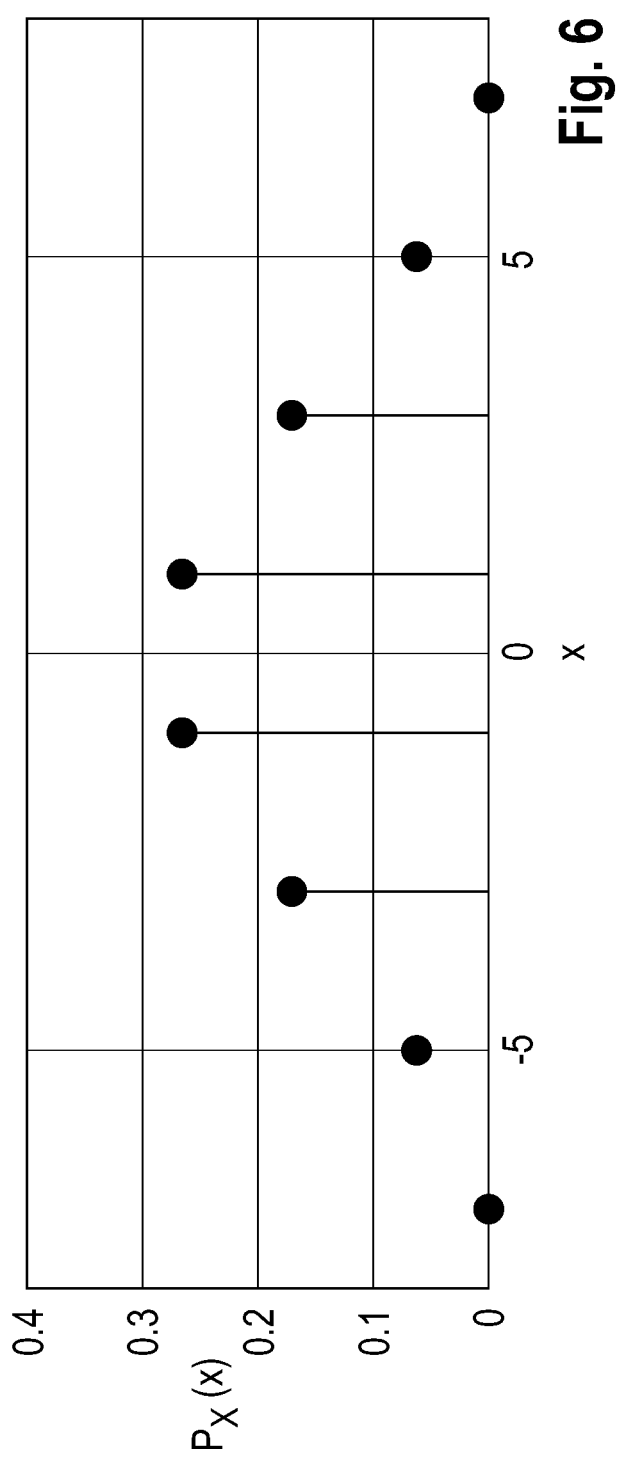
Figure 7:
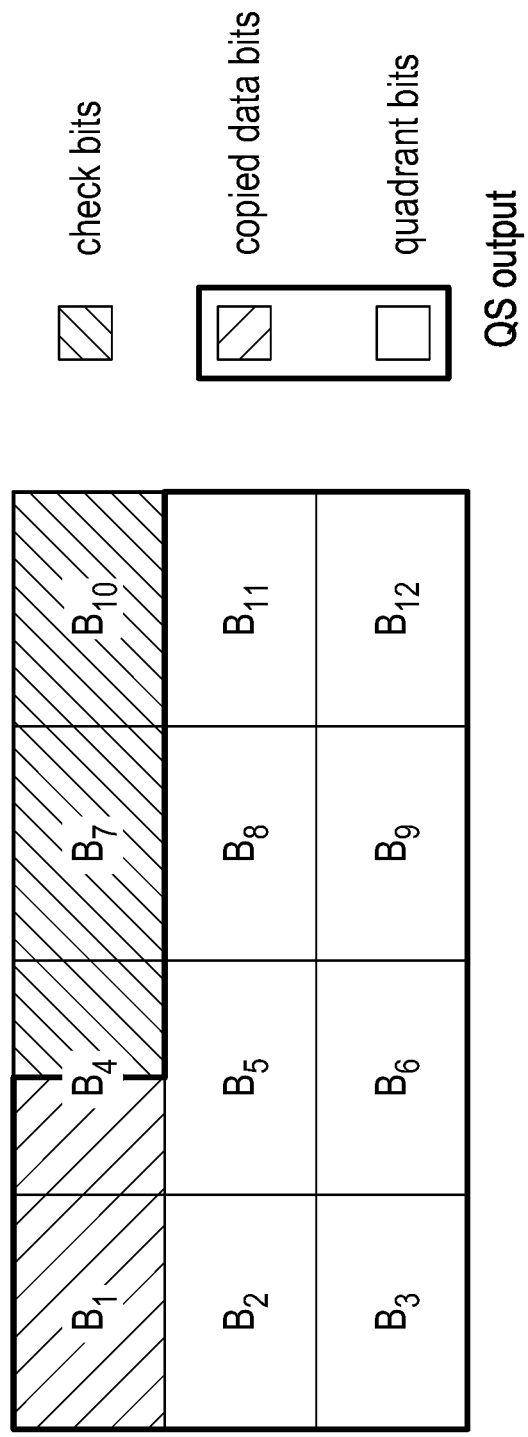

Since in each quadrant, the signal points of smallest power or smallest Euclidean distance from the origin are selected, the signal points of 4D-QS lie within a four-dimensional sphere. As a result, the signal points have a Gaussian-like distribution in each real dimension, in each of the in-phase and quadrature components of both polarizations, as shown in FIG. 6.

Transmitter Side

At the transmitter side, the 4D-QS scheme uses a QS process prior to a FEC encoding process. A system diagram is shown in FIG. 4. Transformations at the transmitter are exemplified for (12, 9)-QS with a FEC rate of c=4/5. The division of the 12 bit levels is shown in FIG. 9.

1. The QS device or process fills bit level $B_1$ corresponding to sign bits completely with data bits from the source T1 of FIG. 1.
2. The QS device or process fills bit level $B_2$ corresponding to sign bits, too, to a fraction of 0.6 with data bits from the source T1.
3. The QS device or process maps 5 data bits to the 8 quadrant bits e.g. according to table 2 shown in FIG. 8.
4. The QS device or process outputs 1+0.6+8=9.6 bits per 4D symbol and the QS rate is given by $$d=(1+0,6+5)/9,6=0,6875. \tag{3}$$

The parameters introduced before are therefore given as k=I+J=6.6, wherein I=5 and J=1.6 are fulfilled.

5. The remaining 2.4 bits per 4D symbol of the 12 bit levels are filled with check bits calculated by a systematic rate c=4/5 FEC encoder. The check bits are used for the sign bit levels $B_7$, $B_{10}$ and the remaining 0.4 fraction of sign bit level $B_2$.
6. Overall, 1+0.6+5=6.6 data bits are transmitted per 4D symbol.
7. The QS process concatenated with the FEC encoder has a rate of $$d \cdot c = 0,55 = 98/178. \tag{4}$$

A state-of-the-art QAM system would use a rate 98/178 FEC code in order to achieve an SE of 98/178·12=6.6 bits per 4D symbol. In table 1 shown in FIG. 9 and in FIG. 10 the performance gains of (12, 9)-QS with FEC rate c=4/5 over state-of-the-art QAM with FEC rate c=98/178 are listed.

Figure 10:
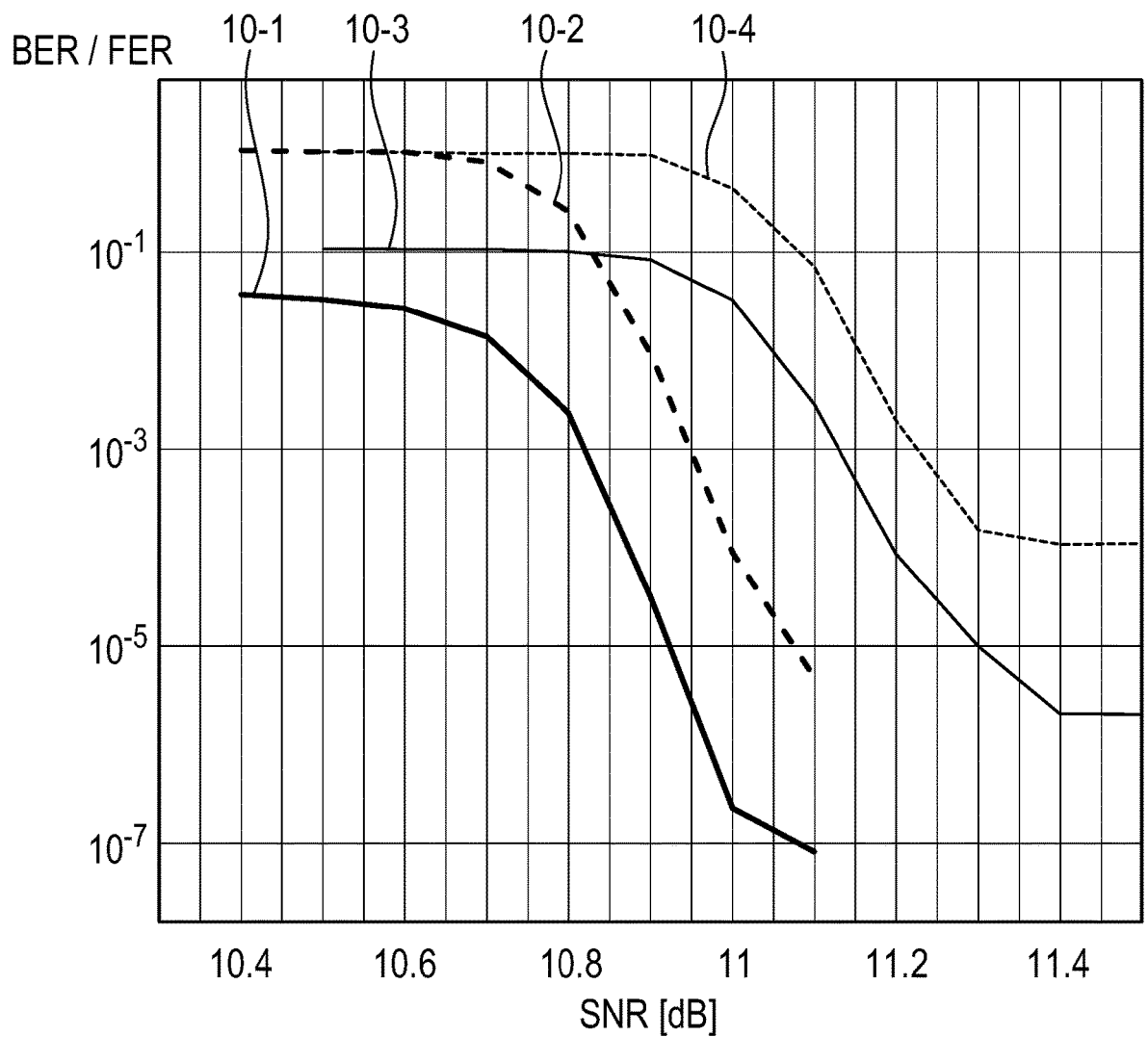

In FIG. 10, traces 10-1 to 10-4 demonstrates different situations obtained by the present invention and according to prior art schemes, in particular with the following parameters Trace 10-1: 4D-QS, DVB-S2 4/5, BER—according to the present invention Trace 10-2: 4D-QS, DVB-S2 4/5, FER—according to the present invention Trace 10-3: QAM, DVB-S2X 98/178, BER—as known in the art Trace 10-4: QAM, DVB-S2X 98/178, FER—as known in the art Receiver Side For each transmitted 4D signal point, the bit-wise demapper uses the received and possibly noisy 4D channel output y to calculate for each bit-level $B_i$ with i=1, 2, . . . , 4m a bit-wise soft-information $$L_i = \log \frac{p_{Y|B_i}(y|0)}{p_{Y|B_i}(y|1)} + \log \frac{P_{B_i}(0)}{P_{B_i}(1)} \tag{5}$$

for i=1, 2, . . . , 12, which is then passed to a binary FEC decoder.

The terms are calculated as follows:

Bit level distribution: The values of the bit-level vector $B=B_1, \ldots, B_{4m}$ are uniformly distributed on its support, i.e.

$$P_B(b) = \begin{cases} 2^{-I-4} & \Leftrightarrow b \in sup(P_B) \\ 0 & \text{otherwise} \end{cases} \text{ with } b \in \{0,1\}^{4m}, \tag{6}$$

wherein the support $sup(P_B)$ of $P_B$ is defined by the following relation (7):

$$sup(P_B) := \{b \in \{0,1\}^{4m} : P_B(b) > 0\}. \tag{7}$$

Recall that for QS, the support consists of the $2^{I+4}$ signal points of least power.

In other words: $P_B(b) = 2^{31\ I-4}$, if the constellation point in question having label b is chosen by the DM process, i.e. if this constellation point is within the underlying look up table as e.g. shown in FIG. 8.

Marginal distributions are given by the following relation (8):

$$P_{B_i}(a) = \sum_{\substack{b \in sup(P_B) \\ b_i = a}} \frac{1}{2^{I+4}} \text{ with } a \in \{0, 1\}. \quad (8)$$

For the (12, 9)-QS, the marginal distributions are exemplified in table 3 shown in FIG. 9.

The conditional distributions are given by the following relation (9):

$$p_{Y|B_i}(y|a) = \frac{1}{P_{B_i}(a)} \cdot \sum_{\substack{b \in sup(P_B) \\ b_i = a}} p_{Y|B}(y|b) \frac{1}{2^{I+4}} \text{ with} \quad (9)$$

$$a \in \{0|1\}.$$

wherein B and b have several components and may therefore be referred to as vector entities and $p_{Y|B}$ is the conditional four-dimensional channel density, e.g. a multivariate Gaussian density in case of an additive white Gaussian noise or AWGN channel.

LIST OF REFERENCE SIGNS

C signal conversion section/process/unit/system
DEMOD QAM demodulator
DM distribution matching process/unit
$DM^{-1}$ inverse/inverted distribution matching process/unit
FEC DEC forward error correction decoder
FEC ENC forward error correction encoder
IB input symbol/bit stream
IB' input symbol/bit stream
IBj input symbol/bit, j=1, 2, . . .
IBj' input symbol/bit, j=1, 2, . . .
$IB^k$ partial input symbol/bit sequence of length k
k QS input length with k=I+J
I number of index bits used to address points within a quadrant
J additional (fractional) number of bits used for the information part
MOD QAM modulator
OB output symbol/bit stream
OB' output symbol/bit stream
OBj output symbol/bit, j=1, 2, . . .
OBj' output symbol/bit, j=1, 2, . . .
$OB^k$ partial output symbol/bit sequence of length k
OT optical transmission method/system
QS quadrant shaping process/unit
$QS^{-1}$ inverse quadrant shaping process/unit
r(t) sent signal, after channel T4 and before demodulator T5
RC signal reconversion section/process/unit/system
s(t) signal to be sent, after modulator T3 and before channel T4
T transmission/reception method/system
T1 information source unit
T2 encoding unit
T3 modulator unit
T4 transmission/reception (waveform) channel unit
T5 demodulator unit
T6 decoder unit
T7 information sink unit
U signal from source T1, before encoder T2
V signal to sink T7, after decoder T6
X signal, after encoder T2 and before modulator T3
Y signal, after demodulator T5 and before decoder T6

The invention claimed is:

1. A method (C) for converting a data signal (U), the method comprising processes of:
   providing an input bit stream (IB) of input bits (IBj), the input bit stream (IB) being representative for the data signal (U) to be converted; and
   applying to consecutive disjunct partial input bit sequences ($IB^k$) of a number of k consecutive input bits (IBj) covering the input bit stream (IB) a distribution matching process (DM) to generate and output a final output bit stream (OB) or a preform thereof;
wherein
k is a fixed natural number; and
the distribution matching process (DM) is formed by a quadrant shaping process (QS) and configured to map a respective partial input bit sequence ($IB^k$) to a constellation point of a four-dimensional $2^{4 \cdot m}$-QAM constellation, with the distribution matching process in particular being configured to convey two distinct polarizations for each of an in-phase component and a quadrature component; and
wherein
m is a fixed natural number; and
k and m fulfill the relations $4 \cdot m \geq k$ and k=J+I, with I being a fixed natural number and with J≤4.

2. The method (C) according to claim 1,
wherein the four-dimensional $2^{4 \cdot m}$-QAM constellation is given as a or by a Gray code labeled four-dimensional QAM constellation based on a $2^m$-ASK constellation.

3. The method (C) according to claim 2,
wherein each Gray code labeled constellation point of the four-dimensional $2^{4 \cdot m}$-QAM constellation is defined or labeled by a 4·m-tuple $B_1 B_2 \ldots B_{4m}$ of bits,
   with components $B_1$, $B_{m+1}$, $B_{2m+1}$, $B_{3m+1}$ denoting or choosing as sign bits the constellation point's quadrant; and
   with remaining components $B_2, \ldots, B_m, B_{m+2}, \ldots, B_{2m}, B_{2m+2}, \ldots, B_{3m}, B_{3m+2}, \ldots, B_{4m}$ denoting or choosing respective constellation point in a quadrant.

4. The method (C) according to claim 3, wherein from the k consecutive input bits (IB) a number of I input bits (IBj) with I≤k is used in order to select points in a quadrant, and the remaining number of J input bits (Bj) are used for specifying at least partly the sign bits, in particular with k=I+J.

5. The method (C) according to claim 3,
wherein from entire set of $2^{4 \cdot (m-1)}$ constellation points of a quadrant those $2^I$ constellation points are chosen in each quadrant for the mapping by the distribution matching process (DM) of the input bit stream (IB) which have the smallest power, in particular in order to thereby achieve a Gaussian like distribution of the constellation points mapped in each dimension.

6. The method (C) according to claim 1,
wherein the distribution matching process (DM) is followed according to this particular order:
   firstly by a forward error correction encoding process (FEC ENC); and
   secondly by a QAM modulation process (MOD).

7. A method (RC) for reconverting a converted data signal (Y), the method comprising processes of:
   providing an input bit stream (IB') of input bits (IBj'), the input bit stream (IB') directly or indirectly being representative for the converted data signal (Y) to be reconverted or a derivative thereof; and applying to the input bit stream (IB') or to the derivative thereof an inverse distribution matching process ($DM^{-1}$) to generate and output a final output bit stream (OB');

wherein the inverse distribution matching process ($DM^{-1}$) is formed by an inverse quadrant shaping process ($QS^{-1}$) and configured to map a respective constellation point of a four-dimensional $2^{4 \cdot m}$-QAM constellation, in particular being configured to convey two distinct polarizations for each of an in-phase component and a quadrature component, to a partial output bit sequence ($OB^{k_1}$) of a length of k output bits ($OBj'$);

wherein m is a fixed natural number fulfilling the relation $4 \cdot m \geq k$; and the consecutive partial output bit sequences ($OB^{k_1}$) are disjunct and form and output a reconverted signal (V).

8. The method (RC) according to claim 7, wherein the four-dimensional $2^{4 \cdot m}$-QAM constellation is given as a or by a Gray code labeled four-dimensional QAM constellation based on a $2^m$-ASK constellation.

9. The method (RC) according to claim 8, wherein each Gray code labeled constellation point of the four-dimensional $2^{4 \cdot m}$-QAM constellation is defined or labeled by a 4·m-tuple $B_1 B_2 \ldots B_{4m}$ of bits, with components $B_1$, $B_{m+1}$, $B_{2m+1}$, $B_{3m+1}$ denoting or choosing as sign bits constellation point's quadrant; and with remaining components $B_2, \ldots, B_m, B_{m+2}, \ldots, B_{2m}, B_{2m+2}, \ldots, B_{3m}, B_{3m+2}, \ldots, B_{4m}$ denoting or choosing respective constellation point in a quadrant.

10. The method (RC) according to claim 9, wherein from entire set of $2^{4 \cdot (m-1)}$ constellation points of a quadrant those $2^I$ constellation points are chosen in each quadrant for the mapping by the inverse distribution matching process ($DM^{-1}$) of the input bit stream (IB') which have the smallest power to thereby achieve a Gaussian like distribution of the constellation points mapped in each dimension.

11. The method (RC) according to claim 7, wherein the inverse distribution matching process ($DM^{-1}$) comes after a QAM demodulation process (DEMOD); and a forward error correction decoding process (FEC DEC).

12. The method (C) according to claim 1, wherein the process of providing the input bit stream (IB) comprises at least one of:

recalling the input bit stream (IB) from a storage medium or from a symbol generation process; and receiving, demodulating and/or decoding a signal being representative for or conveying the input bit stream (IB).

13. The method (C) according to claim 1, wherein at least one of the distribution matching processes (DM), the quadrant shaping process (QS), and a QAM modulation process (MOD) is at least based on and chosen from one of:

(a) according to a predefined distribution to be achieved for an output and in particular based on a Gaussian distribution; and (b) to achieve an approximation of an empirical distribution of the final output bit stream (OB) to a respective underlying distribution by accordingly indexing respective output sequences out of a respective entire set of candidates.

14. A data transmission and reception system (T) with a data transmission section configured to perform the method (C) of claim 1.

15. The data transmission and reception system (T) of claim 14, comprising a processing unit configured to perform the method (C) for converting the data signal (U).

16. The method (C) according to claim 3, wherein the sign bits used to form the components $B_1$, $B_{m+1}$, $B_{2m+1}$, $B_{3m+1}$, for the constellation points originate from at least one of:

a source (T1) of the input bit stream (IB); and parity bits after a forward error correction encoding process (FEC ENC).

17. The method (C) according to claim 4, wherein from entire set of $2^{4 \cdot (m-1)}$ constellation points of a quadrant those $2^I$ constellation points are chosen in each quadrant for the mapping by the distribution matching process (DM) of the input bit stream (IB) which have the smallest power, in particular in order to thereby achieve a Gaussian like distribution of the constellation points mapped in each dimension.

18. The method (C) according to claim 16, wherein from entire set of $2^{4 \cdot (m-1)}$ constellation points of a quadrant those $2^I$ constellation points are chosen in each quadrant for the mapping by the distribution matching process (DM) of the input bit stream (IB) which have the smallest power, in particular in order to thereby achieve a Gaussian like distribution of the constellation points mapped in each dimension.

19. The method (RC) according to claim 7, wherein the process of providing the input bit stream (IB') comprises at least one of:

recalling the input bit stream (IB') from a storage medium or from a symbol generation process; and receiving, demodulating and/or decoding a signal being representative for or conveying the input bit stream (IB').

20. The method (RC) according to claim 7, wherein at least one of the inverse distribution matching process ($DM^{-1}$), the inverse quadrant shaping process ($QS^{-1}$), and a QAM demodulation process (DEMOD) is at least based on and chosen from one of:

(a) according to a predefined distribution to be achieved for an output and in particular based on a Gaussian distribution; and (b) to achieve an approximation of an empirical distribution of the final output bit stream (OB') to a respective underlying distribution by accordingly indexing respective output sequences out of a respective entire set of candidates.

* * * * *

UNITED STATES PATENT AND TRADEMARK OFFICE
CERTIFICATE OF CORRECTION

PATENT NO. : 10,826,619 B2
APPLICATION NO. : 16/471496
DATED : November 3, 2020
INVENTOR(S) : Georg Böcherer, Patrick Schulte and Fabian Steiner Page 1 of 1

It is certified that error appears in the above-identified patent and that said Letters Patent is hereby corrected as shown below:

In the Claims

Claim 4, Column 12, Line 45, after "from the k consecutive" please delete "input bits (IB)" and insert --input bits ($IB_j$)-- therefor.

Claim 13, Column 13, Lines 58-59, after "the distribution matching" please delete "processes (DM)" and insert --process (DM)-- therefor.

Signed and Sealed this
Nineteenth Day of January, 2021

Andrei Iancu
*Director of the United States Patent and Trademark Office*